US011247607B1

(12) United States Patent
Bunch

(10) Patent No.: US 11,247,607 B1
(45) Date of Patent: Feb. 15, 2022

(54) EXTENDED PERCEPTION SYSTEM

(71) Applicant: Jesse Clement Bunch, Silver Spring, MD (US)

(72) Inventor: Jesse Clement Bunch, Silver Spring, MD (US)

(73) Assignee: Deepstone LLC, Dallas, TX (US)

( * ) Notice: Subject to any disclaimer, the term of this patent is extended or adjusted under 35 U.S.C. 154(b) by 0 days.

(21) Appl. No.: 16/271,614

(22) Filed: Feb. 8, 2019

Related U.S. Application Data

(62) Division of application No. 15/330,973, filed on Mar. 16, 2016, now abandoned.

(51) Int. Cl.
*B60R 1/00* (2006.01)
*B60K 35/00* (2006.01)

(52) U.S. Cl.
CPC .............. *B60R 1/00* (2013.01); *B60K 35/00* (2013.01); *B60R 2300/102* (2013.01); *B60R 2300/105* (2013.01); *B60R 2300/205* (2013.01); *B60R 2300/30* (2013.01); *B60R 2300/301* (2013.01); *B60R 2300/302* (2013.01); *B60R 2300/50* (2013.01)

(58) Field of Classification Search
None
See application file for complete search history.

(56) References Cited

U.S. PATENT DOCUMENTS

| | | | | |
|---|---|---|---|---|
| 6,351,273 B1* | 2/2002 | Lemelson | ............... | G06F 3/013 704/271 |
| 9,788,714 B2* | 10/2017 | Krueger | ................... | A61B 5/11 |
| 10,061,352 B1* | 8/2018 | Trail | ........................ | H04R 1/08 |
| 10,116,873 B1* | 10/2018 | Campbell | .......... | H04N 5/23293 |
| 10,182,720 B2* | 1/2019 | Hennessey | ......... | G06K 9/00845 |
| 10,345,591 B2* | 7/2019 | Samec | ................. | A61B 3/1005 |
| 10,567,641 B1* | 2/2020 | Rueckner | ............. | H04N 5/2257 |
| 2011/0221656 A1* | 9/2011 | Haddick | ............ | G06K 9/00617 345/8 |
| 2011/0270135 A1* | 11/2011 | Dooley | ................. | A61B 5/1114 600/595 |
| 2013/0083003 A1* | 4/2013 | Perez | ................ | G06K 9/00335 345/419 |
| 2014/0232639 A1* | 8/2014 | Hayashi | .................. | G06F 3/048 345/156 |
| 2016/0270656 A1* | 9/2016 | Samec | ................. | A61B 5/6803 |
| 2017/0068119 A1* | 3/2017 | Antaki | ................. | H04N 5/2258 |
| 2017/0108697 A1* | 4/2017 | El-Ghoroury | ...... | G02B 27/0081 |
| 2017/0171533 A1* | 6/2017 | Benitez | ................. | G02B 30/27 |

* cited by examiner

*Primary Examiner* — Chikaodili E Anyikire
(74) *Attorney, Agent, or Firm* — Law Office Of Michael O'brien; Michael O'Brien

(57) ABSTRACT

This invention relates to an Extended Perception System that extends the perception of an object's surroundings. Three closely related primary sets of embodiments of this invention include: one set of embodiments is mounted on a set of one or more vehicles; a second set of embodiments is worn by a set of one or more persons and/or animals; and a third set of embodiments which can be in a location fixed with respect to terrestrial and/or other features. Improvements to head-mounted displays are disclosed.

32 Claims, 16 Drawing Sheets

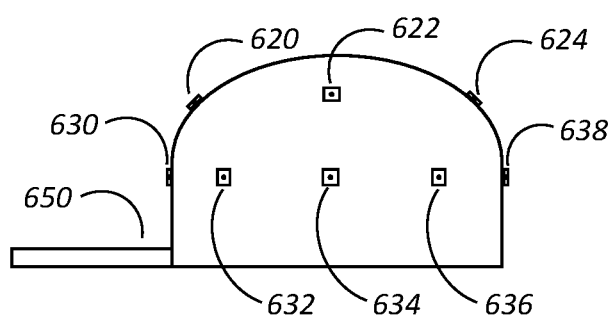
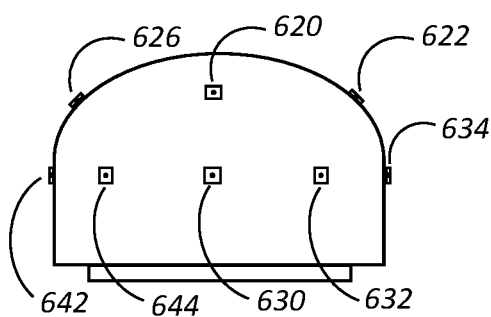
FIG. 8A  FIG. 8B
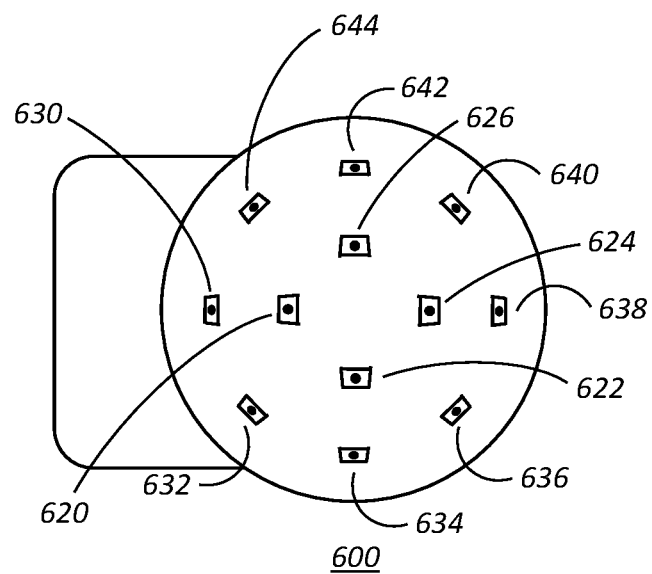
FIG. 8C

EXTENDED PERCEPTION SYSTEM

RELATED APPLICATION

This application is a continuation of non-provisional patent application U.S. Ser. No. 15/330,973 filed on Mar. 16, 2016, which, in turn, claims priority to provisional patent application U.S. Ser. No. 62/177,498, filed Mar. 16, 2015, the entire contents of both applications is herein incorporated by reference.

BACKGROUND

This invention relates to an Extended Perception System that extends the perception of an object's surroundings. Three closely related primary sets of embodiments of this invention include: one set of embodiments is mounted on a set of one or more vehicles; a second set of embodiments is worn by a set of one or more persons and/or animals; and a third set of embodiments which can be in a location fixed with respect to terrestrial and/or other features. Improvements to head-mounted displays are disclosed.

Art related to certain elements of this invention includes security systems with multiple cameras and one display, radio telescope arrays, array microphones, esurance's DriveSense, OnStar, black boxes on aircraft, elements of self-driving car technology, 360° car camera systems, dashboard camera systems (such as Falcon Zero HD Car Rear-View Dash Cam), and head-mounted displays, such as: Google Glass, Occulus Rift, Microsoft HoloLens, Carl Zeiss Cinemiser, and Sony SmartEyeGlass.

SUMMARY

This invention relates to an Extended Perception System (EXP) that extends the perception of an object's surroundings. Herein "perception" comprises sensing, processing, monitoring, storage of data, provision of intervention regarding the results of any operation(s) on the data and/or any combination thereof. Herein, an "object" can comprise a single object, (for example a vehicle and/or a person), a set, or sets of objects. Herein "surroundings" comprises any area and/or group of areas relevant to said object. As such, said "object" might be local or remote from said "surroundings".

Some embodiments provide a multidirectional view of said object's surroundings. Herein, a "view" can comprise a representation and/or representations of the surroundings resulting from any form of radiant energy emanating from, reflected from, refracted through, and/or diffracted about said surroundings and/or any combination thereof and/or other types of information, including but not limited to other types of data described herein. Herein, "view" comprises view as specified in the previous sentence, in addition to representations derived from previously stored data about the surroundings. Herein, "view" also comprises state data about the object, such as its location and orientation in a coordinate system.

Relative to the object, the perception can be local, remote, and/or any combination thereof. For example, the sensors of the data, the processing of the data, the monitoring of the data, the provision of intervention, and/or the recording of the data can be done locally, remotely and/or any combination thereof. Herein "sensor" refers to a set of one or more sensors and/or virtual sensors.

Three closely related primary sets of embodiments of this invention include: one set of embodiments is mounted on a set of one or more vehicles; a second set of embodiments is worn by a set of one or more persons and/or animals; and a third set of embodiments which can be in a location fixed with respect to terrestrial and/or other features.

EXP Systems can comprise: one or more Sensor Subsystem(s); and/or one or more Processor Subsystem(s); and/or one or more Display Subsystem(s); and/or one or more Monitor Subsystem(s); and/or one or more Intervention Subsystem(s); and/or one or more Storage Subsystem(s). Some EXP embodiments may comprise a single of the elements listed in the previous sentence

BRIEF DESCRIPTION OF THE FIGURES

The detailed description of some embodiments of the invention is made below with reference to the accompanying figures, wherein like numerals represent corresponding parts of the figures.

FIGS. 8A-8C illustrate an Extended Perception System embodiment that can be worn by a person.

DETAILED DESCRIPTION OF CERTAIN EMBODIMENTS

Figure 1:
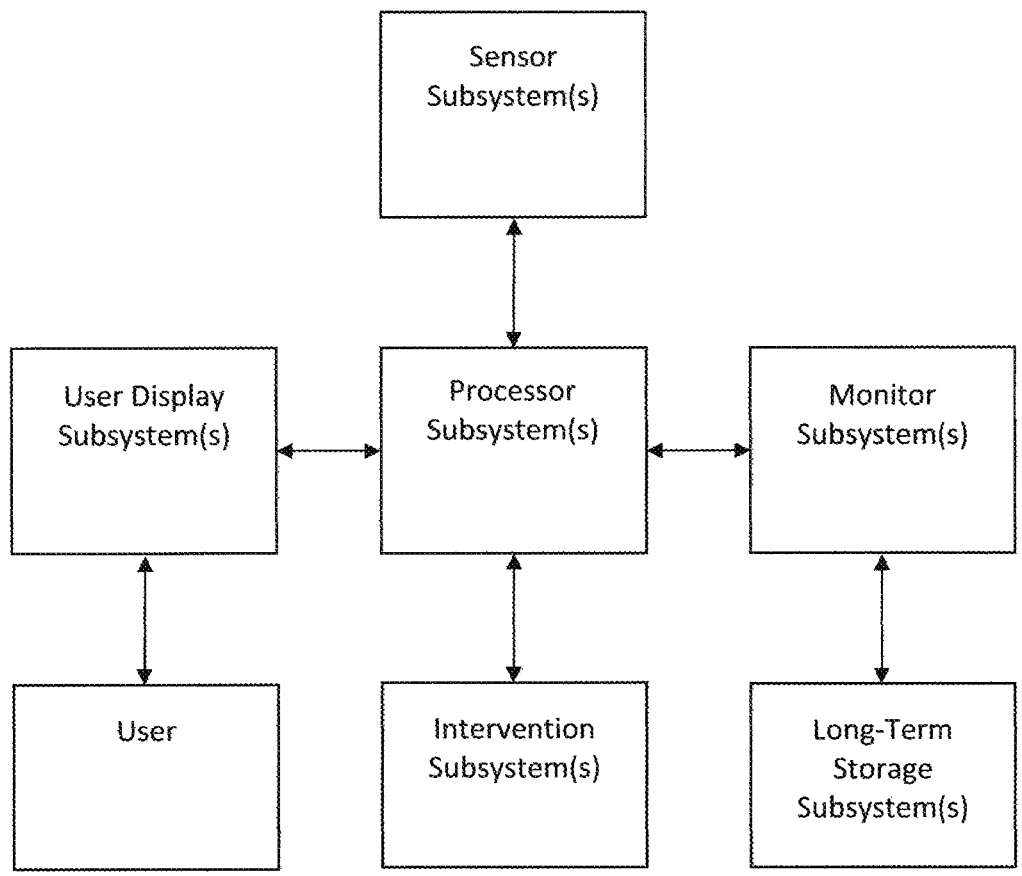
FIG. 1 illustrates an overview of the Sensor-based embodiments of the instant invention.

FIG. 1 illustrates an overview of the Sensor-based embodiments of the instant invention. At least one Sensor Subsystem feeds sensor data to at least one Processor Subsystem. The Processor Subsystem(s) optionally can regulate the Sensor Subsystem(s). The Processor Subsystem(s) can include a short-term loop that temporarily stores a record of the data from the Sensor Subsystem(s). The Display Subsystem(s) potentially can display information from a subset of the other subsystems to the User. In a subset of embodiments, the User can select what information is displayed by the Display Subsystem(s) at a given time. The Monitor Subsystem(s) comprises one or more non-user observers of the situation. There are cases where the Monitor Subsystem comprises the User. The Monitor Subsystem(s), the User, and/or the Processor Subsystem(s)

can activate the Intervention Subsystem(s) to intervene so as to influence the outcome of the situation. The Storage Subsystem(s) stores data for a useful period of time.

Shown data paths represent potential data paths not necessarily essential data paths. Shown data paths represent logical data flow when, in practice, data paths might bypass particular subsystems, for example, the User might be able to directly communicate with the Intervention Subsystem(s) without passing first through a Processor Subsystem.

Figure 2:
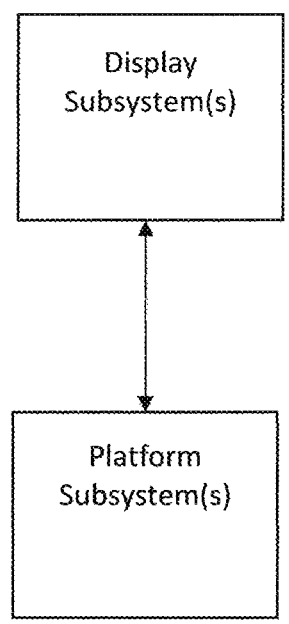
FIG. 2 illustrates an overview of the Platform-based embodiments where the Display Subsystem(s) get the information to display from a Platform such as a Gaming device and/or a computer that generate video display information.

FIG. 2 illustrates an overview of the Platform-based embodiments where the Display Subsystem(s) get the information to display from a Platform such as a Gaming device and/or a computer that generates videos. User feedback to the Platform can alter what information is displayed by the Display Subsystem(s). The source of information to the Display Subsystem(s) can be switched between a set of Platforms, between a set of Sensor Subsystem(s), from a set of Sensor Subsystems to a set of Platforms, and/or from a set of Platforms to a set of Sensor Subsystems.

EXP Sensor Subsystem

Input to sensors can comprise transverse waves such as electromagnet radiation, comprising, for example, one or more of X-ray, UV, visible, IR, microwave, terahertz, and/or radio waves. Sensor input can comprise longitudinal waves such as sound, comprising, for example, one or more of infrasound, audible sound, ultrasound, seismic waves, sound passing through the ground or another solid, a liquid, a gas, a plasma, and/or any mixture or solution of any combination of these. Sensor input can comprise olfactory (identification of chemical composition and/or gradients dissolved in a gas and/or liquid) information. Sensor input can comprise haptic data. Other sensor input can comprise "state of the user (or another object)" information, such as his or its: location, acceleration, velocity, orientation in space, and/or the values of the user's health and/or functionality, comprising variables normally under homeostatic control (e.g. temperature, CO2 concentration in blood, heart rate, etc) or any other detectible information. Some information regarding the state of a vehicle can be accessed, for example, by plugging into the OBD-II port of said vehicle. Sensor input can be real and/or virtual.

FIG. 2 illustrates a very simple EXP where the Display Subsystem receives the data to be displayed from a Platform Subsystem, said Platform Subsystem comprising, for example, a gaming platform such as a PS/4 or Xbox 1. Such data to be displayed in this embodiment typically represents data generated by a video game. The Display Subsystem can include controls that can provide input to the Platform Subsystem to affect what it displays.

Figure 3:
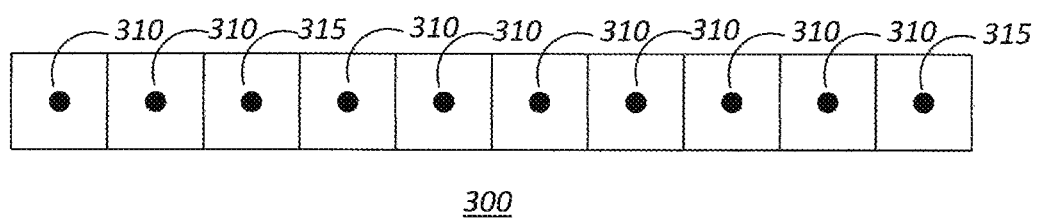
FIG. 3 illustrates a high lens-to-camera ratio array.

FIG. 3 illustrates 300, a high lens-to-camera ratio array (HLCRA). Device 300 comprises a linear array of lenses 310. Some of those lenses 310, designated 315, focus on a light-sensing array, such as a CCD, to form a camera. Many of the lenses 310 do not focus on a light-sensing array and thus are not components of actual cameras. The ratio of total lenses 310 to those focusing to a light-sensing array 315 is typically high (over 2:1) often at least 10:1. There is typically no obvious difference in the casual appearance of a lens that does not focus to a camera and a lens 315 that does. The lens array 300 can be molded as a single unit or the lenses can be made individually. The location of the actual cameras on an HLCRA 300 is random or pseudo-random or some other pattern that makes it difficult for an observer to determine which lens (or lenses) is a part of an actual camera and which are pseudo-cameras. The purpose of HLCRA 300 is to have a minimum number of actual cameras (to reduce the cost) while making it difficult for someone to defeat the system by covering specific lenses. It will be much more difficult to cover an extended array of lenses than a small number of easy-to-identify lenses. If someone were to cover an entire array of lenses, it would be clear that they were attempting to prevent the monitoring and/or recording of the situation . . . a clear indication of negative intent. If someone could cover the entire array, their image would very likely already have been recorded. The HLCRA cameras can be connected to an EXP Processor Subsystem by wires in the back of the array or wirelessly via Bluetooth or another wireless communication system. The normals (the centers of the fields of view) of the cameras can be parallel to one another and perpendicular to the overall surface of HLCRA 300. The normals of one or more of the actual cameras can be tilted vertically to provide a greater vertical field of view, forward or backward to provide a greater horizontal field of view, or any combination thereof. In this case, the normals of pseudo-cameras will also be tilted so the actual cameras cannot be discerned from the pseudo-cameras. The HLCRA 300 can be on a flexible substrate that contains the communication wires (when present). The back can have a peel-off strip revealing an adhesive surface for easy application to the surface on which HLCRA 300 is to be mounted. In this embodiment, the cameras are shown as fixed with respect to the array. In general, the array can be moved relative to the surface it is mounted on and/or individual subsets of the cameras and/or pseudo-cameras can be moved relative to one another.

Figure 4:
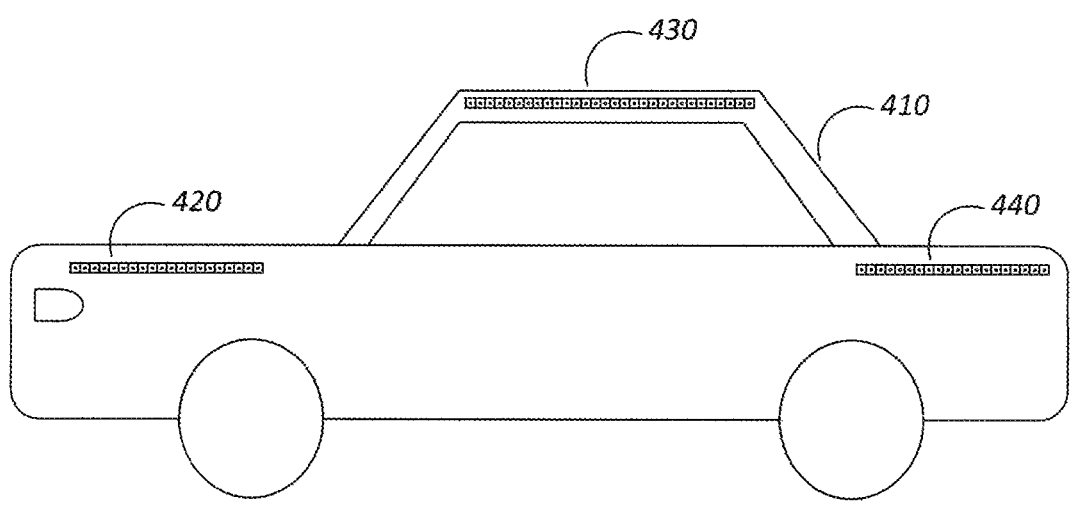
FIG. 4 illustrates an Extended Perception System on the exterior of a car.

FIG. 4 illustrates the use of an Extended Perception System on the exterior of car 410. HLCRA 420 is shown mounted on the front region of the driver's side of the car. HLCRA 430 is shown mounted on middle upper region of the driver's side of the car. HLCRA 440 is shown mounted on rear region of the driver's side of the car. One, two or all of these HLCRAs can be used, as long as a combination of the cameras 315 in the HLCRA(s) can view the entire region on its side of the car. Likewise similar HLCRAs can be mounted on the passenger's side of the car and on the front and rear of the car. Herein, "side" refers to the 6 directions defined by the outfacing normals of a rectangular prism resting on the ground . . . front, back, left and right laterals, top and bottom. HLCRA(s) can also be mounted on any subset of the sides of the car. The HLCRA(s) can be built into a new car 410 or added on later. Similar HLCRAs can be mounted in the trunk or other locations in or on the car 410.

Figure 5A:
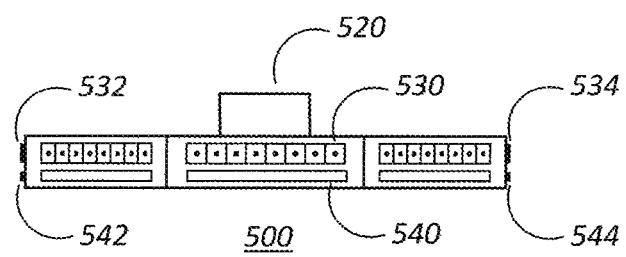
FIGS. 5A-5D illustrate an Extended Perception System for use in the interior of a car.
Figure 5B:
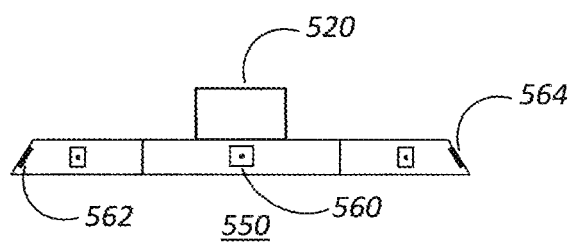
Figure 5C:
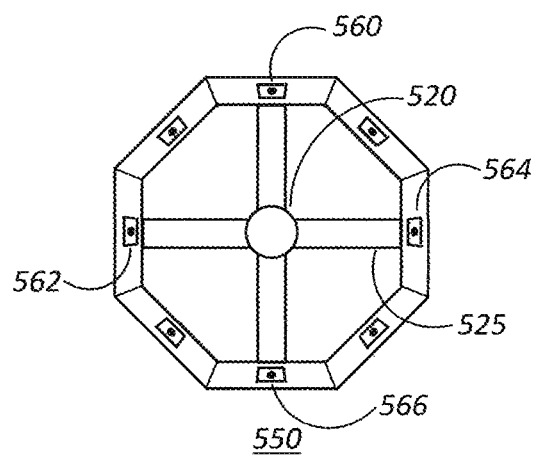
Figure 5D:
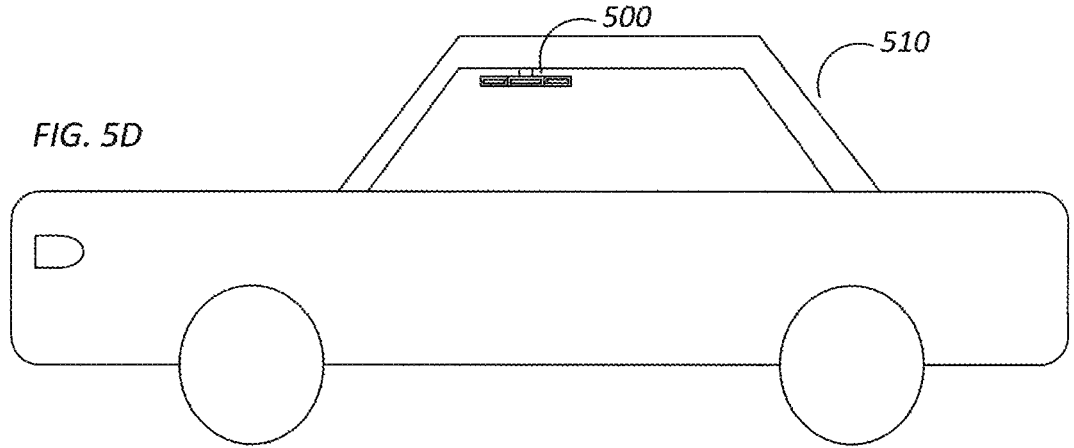

FIGS. 5A-5D illustrate an Extended Perception System 500 for use in the interior of car 510. FIG. 5D illustrates Extended Perception System (EXP) 500 installed in car 510. As illustrated in FIG. 5A, EXP 500 can be mounted such that it is a between the driver and front passenger, preferably above the level of the tops of their heads such that at least some of EXP 500's sensors have a clear line of sight above their heads. It is not required that EXP 500's line of sight be above the heads of the driver and passengers because the extended length of the sensor array provides sufficient parallax such that EXP 500 can view and/or monitor all, or nearly all, of the regions to the sides of the car. Visual sensor array 530 can view the space on the driver's side of car 510. Another visual sensor array can view the space on the front passenger's side of the car 510. Visual sensor array 532 can view the space in the front of car 510. Visual sensor array 534 can view the space behind car 510. Four other visual sensor arrays can view the regions between those of visual sensor arrays 530, the passenger side array, 532, and 534. Each of the visual sensor arrays might also be configured to also view part of the interior of car 510. Each sensor array can be an HLCRA or just an array of one or more sensors. Audio sensor arrays 540, 542, 544 (and the five others) are shown below their respective visual sensor arrays. Mounting 520 is affixed to the interior roof of car 510 and supports the rest of EXP 500.

FIGS. 5B-5C illustrate 550, an optional inner surface of EXP 500. Mounting 520 supports arms 525 that support the rest of 550. Inner Surface 550 views downward with normals oriented between vertical and horizontal. Cameras 560, 562, 564, 566 and the four between each consecutive pair of these provide EXP 500 views of the interior of car 510 including, but not limited to what the driver and passengers are doing. These views can be transmitted to another observer (as described elsewhere herein) and can, for example, be used to assure that observer that the driver and passengers of car 510 are not a threat to said observer or to others.

To better detect sounds outside of a closed vehicle, microphones can be mounted on the outside of said vehicle and/or a sound detection system inside the car can be employed that reflects laser light off the windows to detect the sound vibrations in the glass (as is known in the art). By reflecting the laser light off the surfaces of multiple windows and/or multiple locations on a single window, the reflected light information can be used to capture the sound and, by measuring the delays in the same sounds reaching different parts, that information can be used to locate the source of that sound. One or more glass (or other materials) laser targets can be used with synthetic aperture hardware and/or software to achieve the benefits of that technology.

Other vehicular embodiments can provide cameras in the trunk and/or other areas so that it would be harder for others to plant contraband in the trunk area and/or those other areas.

Figure 6A:
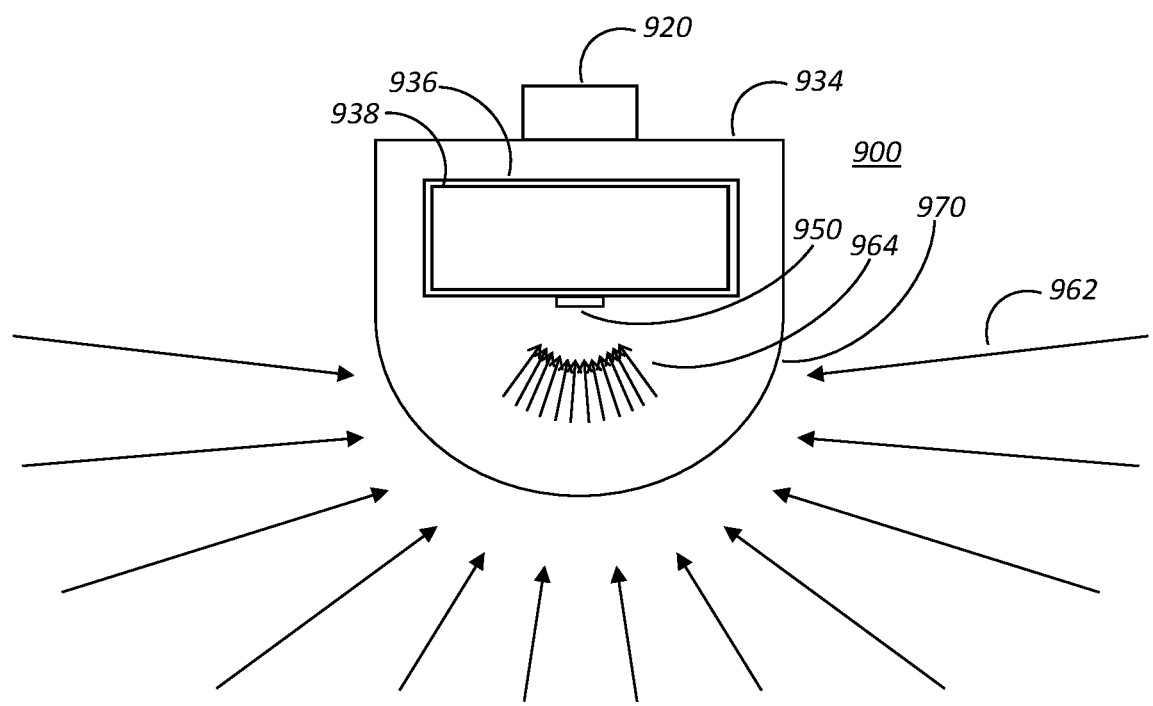
FIGS. 6A and 6B illustrate an alternative Extended Perception System for use in the interior of a car.
Figure 6B:
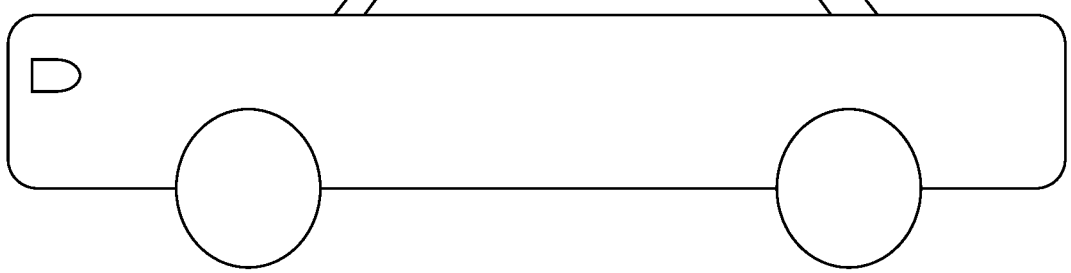

FIGS. 6A and 6B illustrate an alternative Extended Perception System (EXP) 900 for use in the interior of car 910. FIG. 6B illustrates Extended Perception System 900 installed in car 910. These embodiments are designed to reduce the EXP's cost by employing a mobile device to collect the sensor data and transmit it. FIG. 6A illustrates an embodiment where the mobile device is embedded in the EXP 900. Mounting 920 is affixed to the interior roof of car 910 and supports housing 934. Opening 936 in housing 934 supports adapter tray 938. Adapter tray 938 supports the mobile device in such a way that the mobile device will be held securely in opening 936 and aligns one of the mobile device's camera lenses with EXP 900's terminal optics 950. EXP 900 optics 970 redirect light rays 962 from EXP 900's surroundings to the paths 964. An app on the mobile device can transform the image, distorted by EXP's optics, into standard images. This stream can then be input to an app on the mobile device such as Meerkat or Periscope to broadcast images of the surroundings via a cellular network. Alternatively, the broadcast app can transmit the distorted image that can then be corrected after transmission. The image stream can be used for perception (such as, displayed locally and/or sent to an EXP Monitoring Subsystem and/or a storage subsystem). EXP 900 can be linked to the electrical system of car 910 to keep the mobile device that is being used by EXP 900 charged. The mobile device can be controlled or used for other functions via voice control. EXP 900's optional EXP display subsystem can have a mode where it displays the image of the mobile device's display for any of its functions.

Figure 7A:
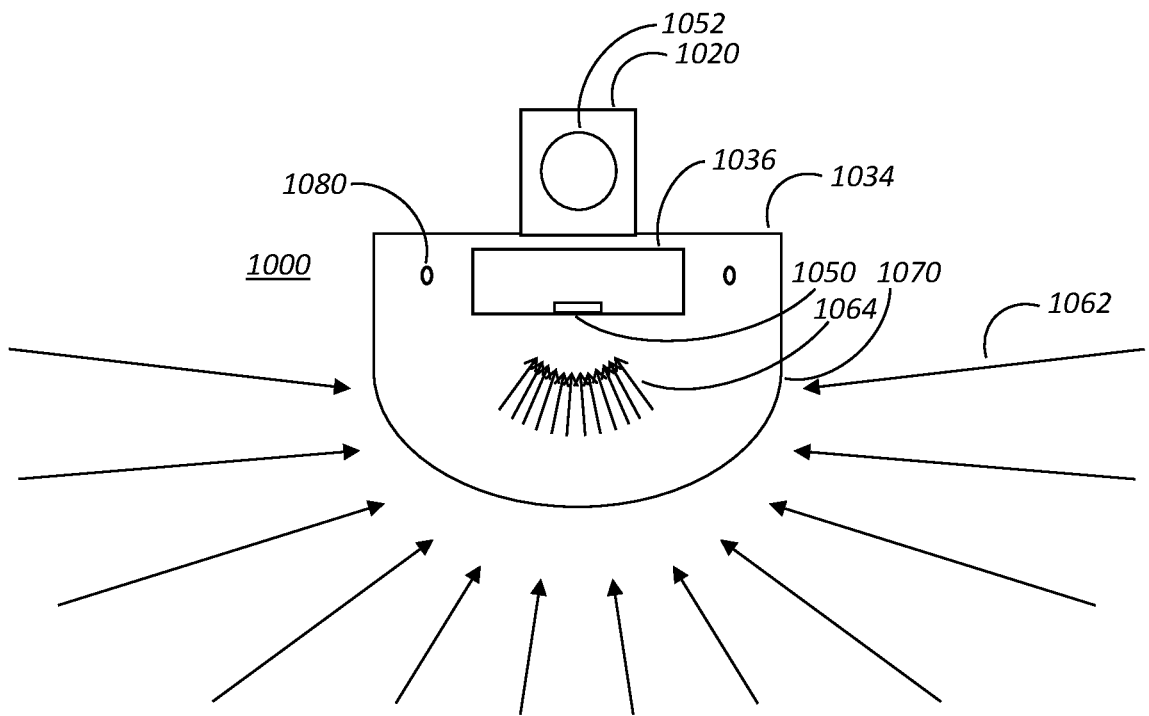
FIGS. 7A and 7B illustrate a second alternative Extended Perception System for use in the interior of a car.
Figure 7B:
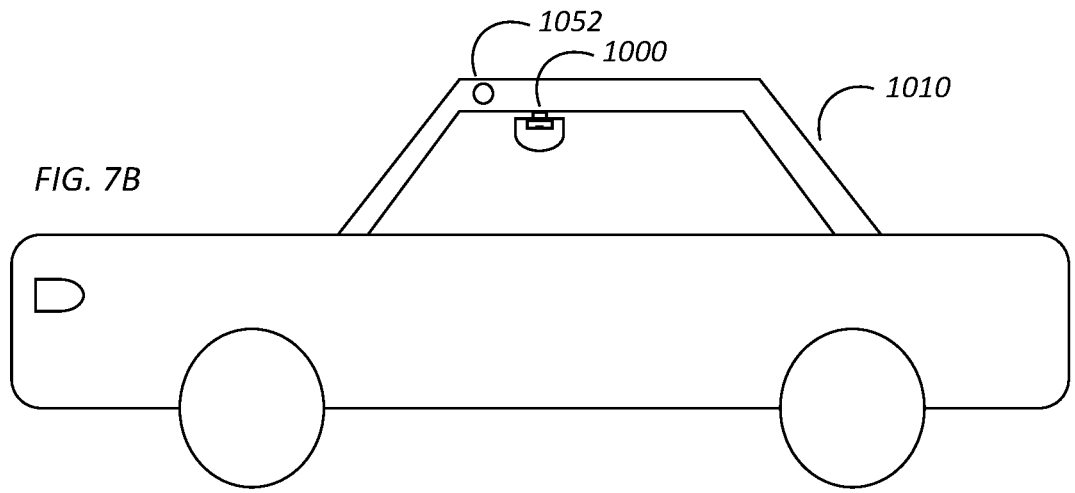

FIGS. 7A and 7B illustrate a second alternative Extended Perception System (EXP) 1000 for use in the interior of car 1010. FIG. 7B illustrates Extended Perception System 1000 installed in car 1010. Like EXP 900, this embodiment is designed to reduce the EXP's cost by employing a mobile device to collect the sensor data and transmit it. FIG. 7 illustrates an embodiment where the mobile device is located separately from EXP 1000. Mounting 1020 is affixed to the interior roof of car 1010 and supports housing 1034. EXP 1000 optics 1070 redirect light rays 1062 to the paths 1064. Light rays 1064 are redirected via EXP 1000's camera 1050. A separate unit mounted on, or near, car 1010's dash supports the mobile device. Said separate unit can be connected to car 1010's electrical system, such that when the mobile device is plugged therein, its battery can be charged. Camera 1050's output is transmitted to the mobile device via wire or wirelessly. An app on the mobile device can transform the image, distorted by EXP's optics, to normal images. This stream can then be input to an app, such as Meerkat or Periscope, on the mobile device to broadcast images of car 1010's surroundings via a cellular network to a Monitor Subsystem. Alternatively, the broadcast app can transmit the distorted image that can then be corrected after transmission. The image stream can be used for perception (such as, displayed locally and/or sent to an EXP Monitoring Subsystem and/or a storage subsystem). The mobile device's display can be used as the entirety, or part of, the EXP 1000 display subsystem. One of multiple optional lasers 1080 reflects off a window (or windshield) to collect sound information to be processed, for example, in the mobile device then made audible to the driver and/or passengers of car 1010 and/or to be uploaded to the Monitor Subsystem. Likewise, data from car 1010's computer can be accessed via its OBD II port and sent wirelessly or via wire to the mobile device. Said Monitor System, for example, can be one or more individuals in a distant location, observing and/or recording what the EXP sensing subsystem is perceiving.

An embodiment of EXP 1000 can be temporarily assigned to a vehicle. Mount 1020, for example, can contain a magnet powerful enough to secure EXP 1000 to the interior ceiling of a vehicle as the roofs of most vehicles are mostly steel, which is ferromagnetic. In this case, the data can be wirelessly transmitted to a Monitoring Subsystem such that safely located monitors can observe the actions in the interior of the vehicle and hear what is occurring therein and observe where the vehicle is and where it is going. This function can be enhanced by the incorporation of a GPS unit in EXP 1000.

EXP 900 and EXP 1000 observe 360° (as viewed from above) around the car 910 or 1010 respectively. Because the EXP System observes the rear of the vehicle, the EXP System can replace the rear view mirror.

FIGS. 8A-8C illustrate EXP 600, an embodiment that can be worn by a person. In this embodiment, visual sensors are mounted on a hat. Alternatively, said sensors can be mounted on a helmet, glasses, a flexible net, and/or any other structure worn on the head and/or any other part of the body. Visual sensors 620, 630, 632, and 644 can view the direction in front of the person's head. Visual sensors 622, 632, 634, and 636 can view to the side left of the person's face. Visual sensors 626, 640, 642, and 644 can view to the side right of the person's face. Visual sensors 624, 636, 638, and 640 can view the direction behind the person's face. This allows the user to monitor what is going on behind him, like having eyes in the back of one's head. Visual sensors 620, 622, 624, and 626 can view the space approximately normal to the plane defined by the eyes and ears. Thus, when a user has his head in the position typically associated with walking, visual sensors 620, 622, 624, and 626 view the space above the user's head.

Note that a subset of the sensors in all EXP embodiments can be movable and/or fixed depending on what is most cost-effective in a specific application. This includes, but is not limited to, vehicle-mounted, head-mounted sensors and/or recruited sensors. Directional sensors can be directed towards the target of interest.

EXP Display Subsystem

Independent of the sensor input type, the sensor output can be displayed visually, auditorally, olfactorally, gustatorially, haptically, kinesthetically, and/or by any means perceivable by the user. The user can be human, animal, other natural organism and/or artificially intelligent. Data displayed as olfactory information can be very useful to dogs, even more useful to sharks whose brain structures for evaluating olfactory information are comparable to those that humans used to evaluate visual information.

Below each sensor in EXP 600 can be a vibration device that informs the user when there is a stimulus of potential importance in the field of view of that sensor. Said vibration can inform the user that he should consider looking in that direction to get more information on the stimulus. If said stimulus is in the field of view of multiple sensors, an EXP Processor Subsystem built into brim 650 can deploy different response algorithms depending upon the nature of said stimulus. For example, a stimulus deemed to be of moderate importance might only trigger vibration in the sensor which has that visual stimulus closest to the center of its "field of view", or multiple sensors if it is relatively equidistant from said multiple sensors. A stimulus deemed to be of greater importance might trigger a vibration under all of the visual sensors that can view it. Different simultaneous stimuli of interest can be distinguished by different frequencies of vibration. Different degrees of potential importance of stimuli can be mapped to different intensities of the vibrations. As the user moves his head, the locus of the vibrations changes to indicate the direction of the stimulus relative to the user's current head orientation.

Another means to inform the user of a stimulus of interest is by auditory feedback. For example, the EXP Processor Subsystem can create auditory signals, fed to the user's ears separately and tailored to cause the human auditory system to perceive the direction of the combined signal as the same as the stimulus of interest. Different intensities, frequencies and/or patterns in the auditory feedback can be used to signal different types of information about the stimulus to the user.

A means to provide an EXP user information from one or more EXP sensors is to display that information. For example, said information can be displayed on a display in a fixed location within a car. Different camera views can be displayed in different windows on the display so as to potentially monitor the entire surrounding space simultaneously.

Amplified Glance Angle Mode

Information from an EXP Sensor Subsystem can be shown on a display that is worn. Such wearable displays can include watches such as the Apple watch and/or head-mounted devices, such as Google Glass, Occulus Rift. Microsoft HoloLens, Carl Zeiss Cinemiser, and Sony SmartEyeGlass. There are numerous ways to display such data on head-mounted displays known to the art.

Figure 9A:
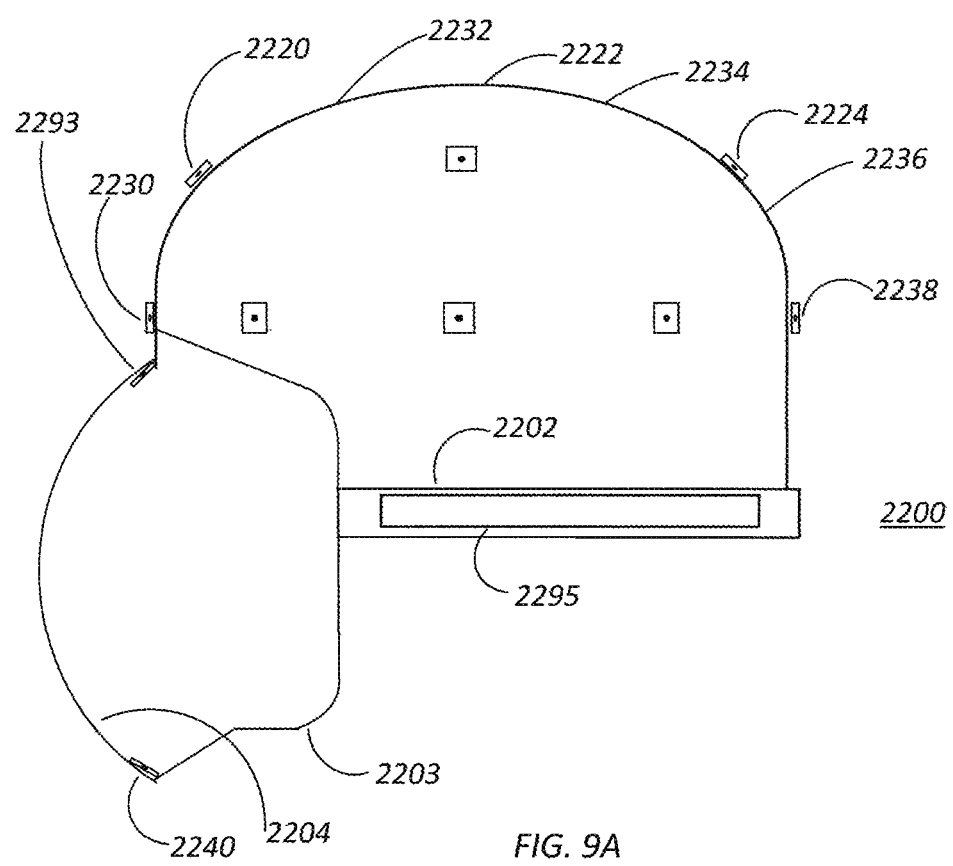
FIGS. 9A-9C illustrate an Extended Perception System with a head-mounted display and an integrated sensor subsystem.
Figure 9B:
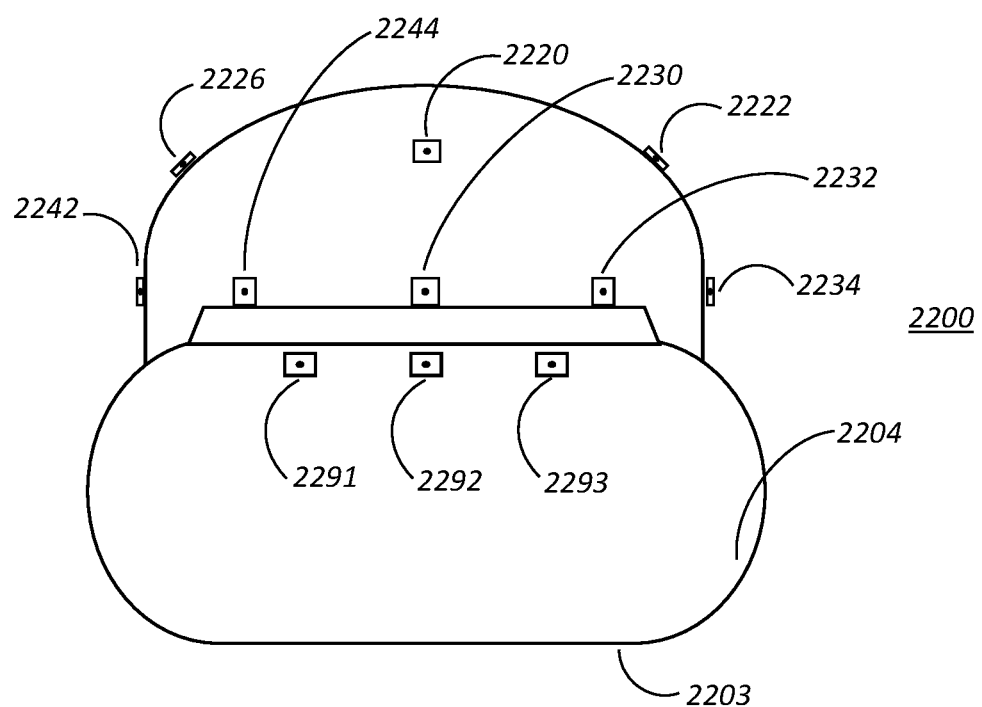
Figure 9C:
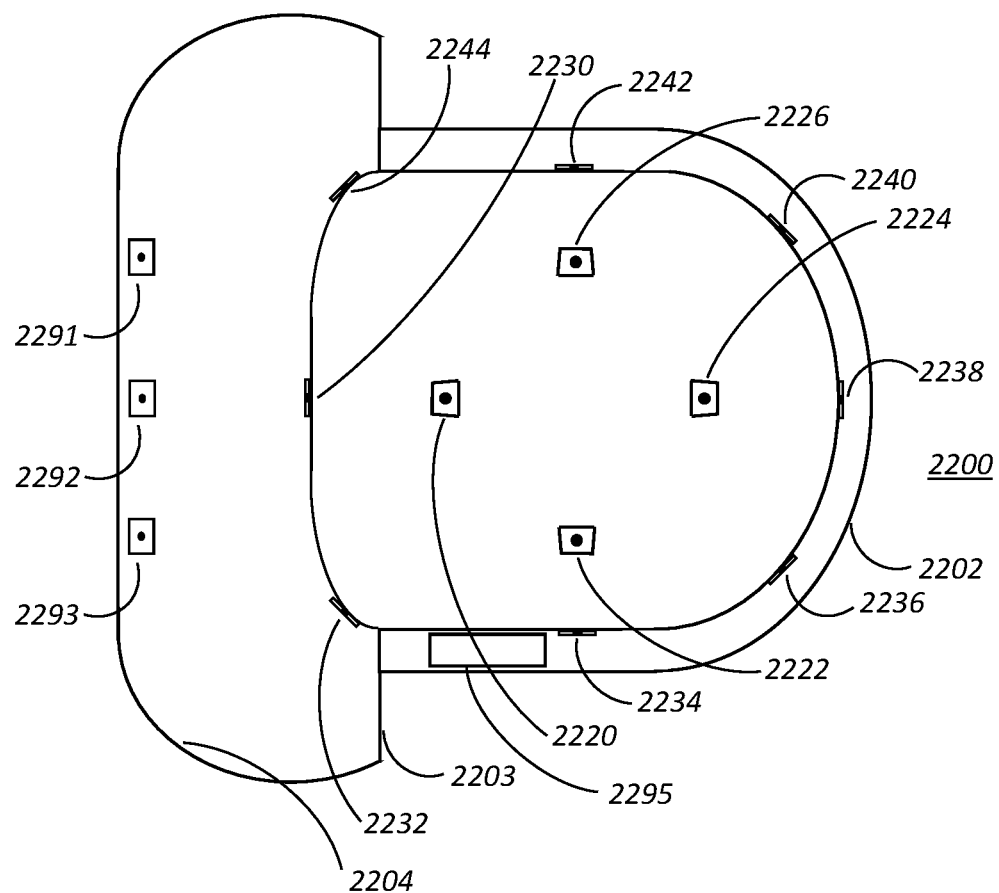

FIGS. 9A-9C illustrate a head-mounted display 2200 with an integrated sensor subsystem similar to 600. One or more real image(s) and/or virtual image(s) and/or holographic image(s) can be projected onto, or by means of, all or part of display housing 2204. Display housing 2204 is secured to the user's head using display housing band 2202.

FIGS. 9A-9C also illustrate the optional Amplified Glance Angle Mode (AGAM), a user interface mode for example, for the display of very wide angle visual data and/or visual representations of non-visual data. AGAM can be used to display EXP Sensor Subsystem data, including EXP Sensor Subsystem data from vehicular-based EXP Sensor Subsystems, worn EXP Sensor Subsystems, fixed EXP Sensor Subsystems and/or other Sensor Subsystems, including but not limited to virtual data sensor data. AGAM can be used for the visual display of any type of data, such as data produced from business software, 2D or 3D Views software (see other patent applications by Jesse Clement Bunch), and/or video games. In AGAM, the deflection of the user's glance with respect to the direction immediately in front of the head is detected by a glance angle detection subsystem (GADS). The GADS can comprise a central camera 2292 that provides an image of one or both of the user's eyes to an EXP Processor 2295. All or part of Processor 2295 can be attached to, or built into, housing 2203 housing and/or band 2202 and/or located elsewhere. Processor 2295 has eye movement detection software that determines the viewing angle of one or both eyes with respect to straight ahead. Said angle of deflection of the eye (glance angle) is mapped into a deflection of the field of view on the display. For example, a glance angle of 15° to the right can cause the display to show the center of the field of view at a deflection of 90° from the user's face. The user sees in the center of his current field of view the center of what he would be seeing if his head were rotated 90° to the right via the view through camera 2242.

Embodiments of 2200 can provide a stereoscopic view by feeding different virtual and/or image information to the user's right eye than is fed to the user's left eye. In FIGS. 9A-9C, glance angle of 15° to the right can cause the display to show a stereoscopic view of what is 90° to the user's right by displaying the data from camera 2244 to his left eye and camera 2240 to his right eye. A glance angle of 15° to the left can cause the display to show a stereoscopic view of what is 90° to the user's left by displaying the data from camera 2236 to his left eye and camera 2232 to his right eye. A glance angle of 30° to the right (or left) can result in a stereoscopic view of what is directly behind the user. This does not alert observers to the direction the user is looking in. In this case, the image from camera 2240 is fed to the user's left eye and the image of camera 2236 is fed to the user's right eye. A glance angle of 15° vertically can cause the display to view the center of the field of view at a vertical deflection of 45° (upper portions of camera 2232's field of view to left eye and upper portions of camera 2244 to right eye) or 30° vertically to cause the display to view the center of the field of view at a vertical deflection of 90° (camera 2222 to left eye and camera 2226 to right eye). As the range of easy motion of each eye is roughly circular, not rectilinear, a combination of smaller glance angles in the vertical and horizontal can provide a vertical view as if the user were facing upwards and backwards. The mappings of glance angle to viewing angle herein are meant to be examples. The relationships between horizontal glance angle and displayed field view and vertical glance angle and displayed field of view need not be the same. Those relationships need not be limited to being linear or fixed. In some embodiments, those relationships can be adjustable by the user. Alternatively, the stereoscopic image can be constructed from two or more images in a processor before being displayed to the user. This applies to all statements in this disclosure regarding feeding one image to one eye and a different image to a second eye. Herein, a "horizontal" glance means a movement of the eyes caused substantially by the medial rectus and lateral rectus muscles of the eye. Herein, a "vertical" glance means a movement of the eyes caused substantially by the superior rectus and inferior rectus muscles of the eye.

The glance angle detection subsystem can comprise camera 2291 which provides an image of the user's right eye to processor 2295 and camera 2293 which provides an image of the user's left eye to processor 2295. When GADS has access to orientation data for both eyes, it can determine both the direction and the range where user is directing his attention. This Convergent Glance Angle Mode (CGAM) can be used to determine the location in space that the user wants to focus on. The user can signal the GADS that he wants to magnify the visual and/or audio display from that location by, for example, rapidly blinking twice or tensing the facial muscles around his eyes. Multiple applications of said signal can cause repeated magnifications in the displayed image. A different signal, such as three rapid blinks can signal a desired decrease in magnification, i.e. to increase the field of view that is displayed. Alternatively, the user's signals to the EXP Display Subsystem can be by a verbal command such as "magnify 10×", and/or other movements and/or by the tensing of given muscle groups and/or by the detection of the firing of particular neurons and/or sets of neurons in the central and/or peripheral nervous systems.

Forward looking visual sensors can be used to improve or even replace the direct forward view of the user's unaided eyes. Combinations of the front facing sensors 2220, 2230, 2232 and 2244 can replace or augment the direct view forward through the heads up partially transparent display. The transparency of the heads up display may be incrementally or continuously variable from complete transparency (direct view only, no image from the forward sensors) to partial transparency (a mix of direct view forward and image from forward sensors) to no transparency (no direct forward view, total image from forward sensors).

Figure 10A:
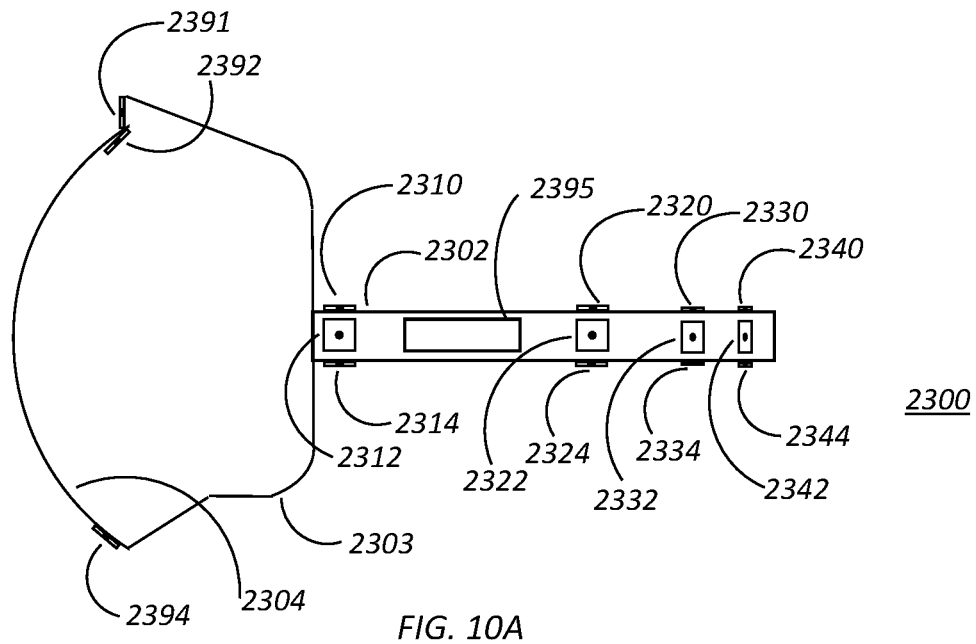
FIGS. 10A-10C illustrate an alternative Extended Perception System with a head-mounted display and an integrated sensor subsystem.
Figure 10B:
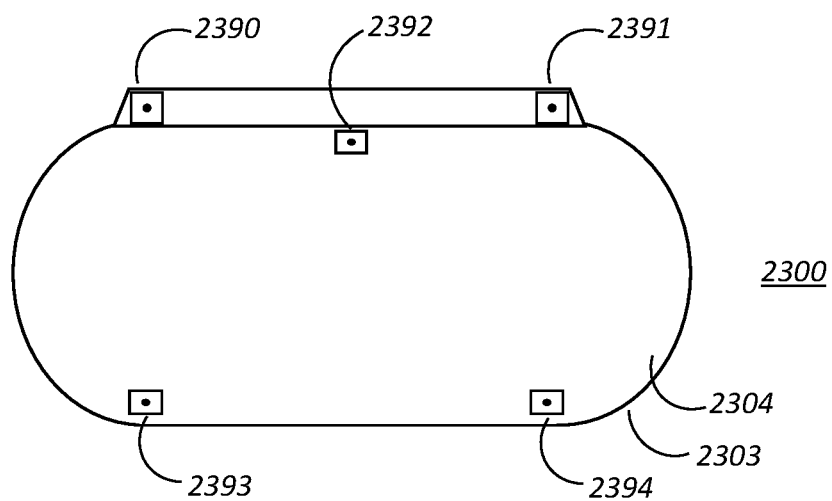
Figure 10C:
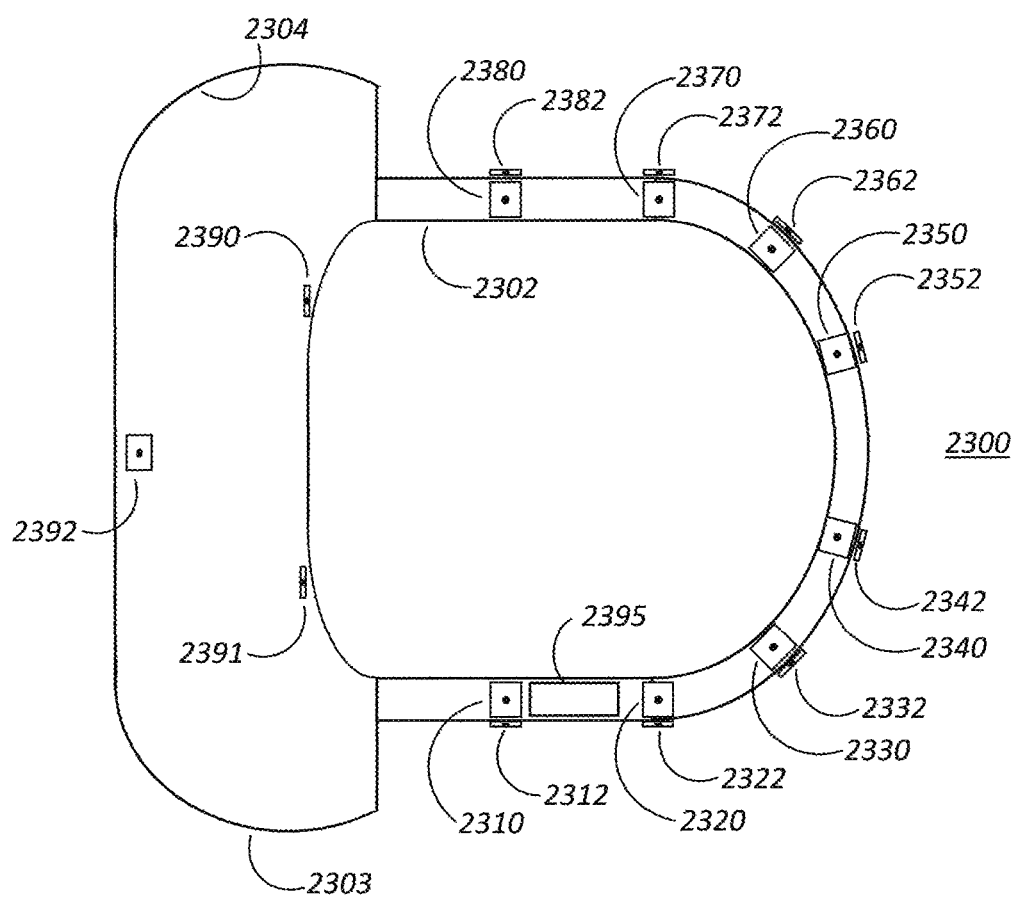

FIGS. 10A-10C illustrate a head-mounted display 2300 with an integrated sensor subsystem that is similar to 2200. In FIGS. 10A-10C, all but the forward facing sensors 2390, 2391, 2393, 2394 are mounted on display housing band 2302. Other cameras comprising the optional sensor subsystem illustrated are cameras 2312, 2322, 2332, 2342, 2352, 2362, 2372, 2382, 2390, 2391 facing horizontally and cameras 2310, 2320, 2330, 2340, 2350, 2360, 2370, 2380 facing vertically upwards and cameras 2314, 2324, 2334, 2344, 2354, 2364, 2374, 2384 facing vertically downwards. The glance angle detection subsystem can comprise a central camera 2392 that provides an image of one or both of the user's eyes to an EXP processor 2395.

Glance location can be used to point to a menu location and a signal from the user can trigger the selection of the menu item. Said signal can, for example, be verbal and/or visual (such as a sequence of blinks). A specific signal can directly trigger a command.

Figure 11A:
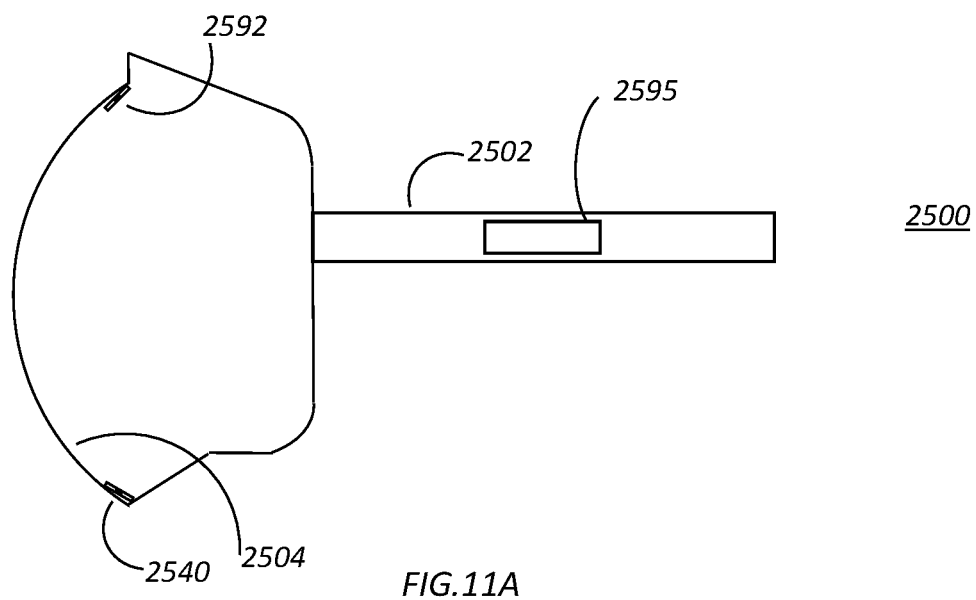
FIGS. 11A-11C illustrate an Extended Perception System with a head-mounted display.
Figure 11B:
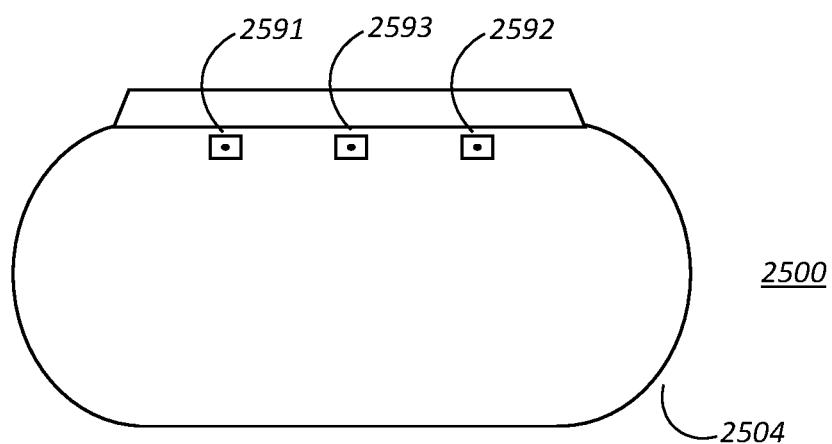
Figure 11C:
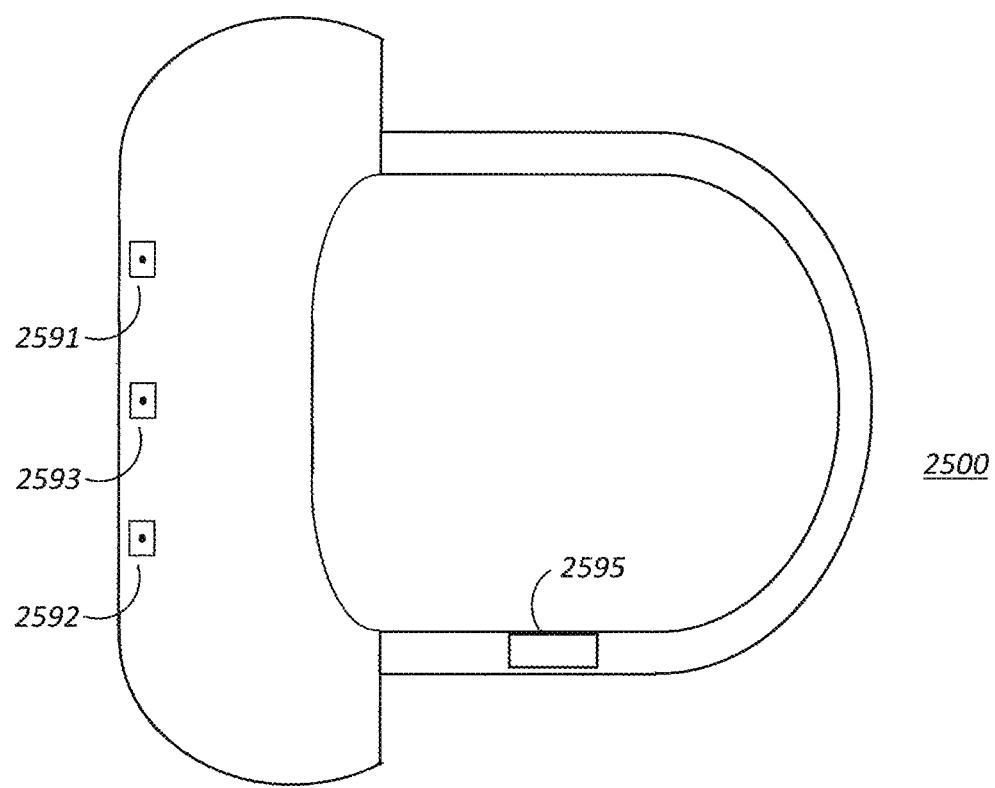

FIGS. 11A-11C illustrate a head-mounted display 2500, similar to the display subsystem of ExP 2200. The glance angle detection subsystem can comprise camera 2591 which provides an image of the user's right eye to processor 2595 and camera 2592 which provides an image of the user's left eye to processor 2595 or central camera 2593 that provides an image of one or both of the user's eyes to an EXP processor 2595. One or more real image(s) and/or virtual image(s) and/or holographic image(s) can be projected onto, or by means of, all or part of display housing 2504. Display housing 2504 is secured to the user's head using display housing band 2502.

Glance location can be used to point to a menu location and a signal from the user can trigger the selection of the menu item. Said signal can, for example, be verbal and/or visual (such as a sequence of blinks). A specific signal can directly trigger a command.

Amplified Head Orientation Mode (AHOM)

Similar to AGAM, the user can change the orientation of his head to indicate the view angle that he wants to be displayed. For example, accelerometers in the head-mounted display, or in a device separately connected to the user's head, can be used to determine the roll and pitch of the user's head relative to the vertical. Data from an accelerometer mounted to the torso of the user can be compared with data from one or more accelerometers in the head-mounted display, or in a device separately connected to the user's head, to determine yaw motion. Other means known to the art (such as Pointing and Identification Device technologies) can be used to determine relative changes in the orientation of the user's head. Just as in AGAM, these changes can be used to signal what the EXP Display Subsystem should display. Analogous to AGAM, this is referred to as Amplified Head Orientation Mode (AHOM). For example, a change in head orientation by angle of 15° to the right can cause the display to show the center of the field of view at a deflection of 90° from the user's face. Without a side glance, the user sees in the center of his current field of view (the center of the display) the center of what he would be seeing if his head were rotated 90° to the right via the view through camera 2242. AGAM and AHOM can be implemented separately or combined to function simultaneously.

A standard display, such as an LED or LCD display can be used to display the sensor data from a vehicle's EXP Sensor Subsystem. A standard 3D display can be used to display stereoscopic AGAM.

A standard display, such as an LED or LCD display can be used to display the sensor data from an AGAM or AHOM.

Just as an array of cameras on a hat can provide different views of a space, an array of cameras can cover nearly all of the head. Cameras on other body parts can also provide useful views. For example, cameras on the front and/or tops of shoes can view upwards to see under cars for security officers to look for bombs and/or contraband mounted under vehicles. Alternatively or together, a camera mounted between the shoulder blades of a jacket or vest can provide a view behind the user. Additionally, a camera mounted on each side of said jacket or vest below the elbows when the arms are to the side of the body and behind the normal locations of the arms can view the directions lateral to the user.

The display can be divided into areas. In each area, a view from a different combination of sensors is displayed.

AGAM and AHOM can be combined such that a change in head orientation and/or glance and/or in combination can be used to signal what the EXP Display Subsystem should display.

Figure 12:
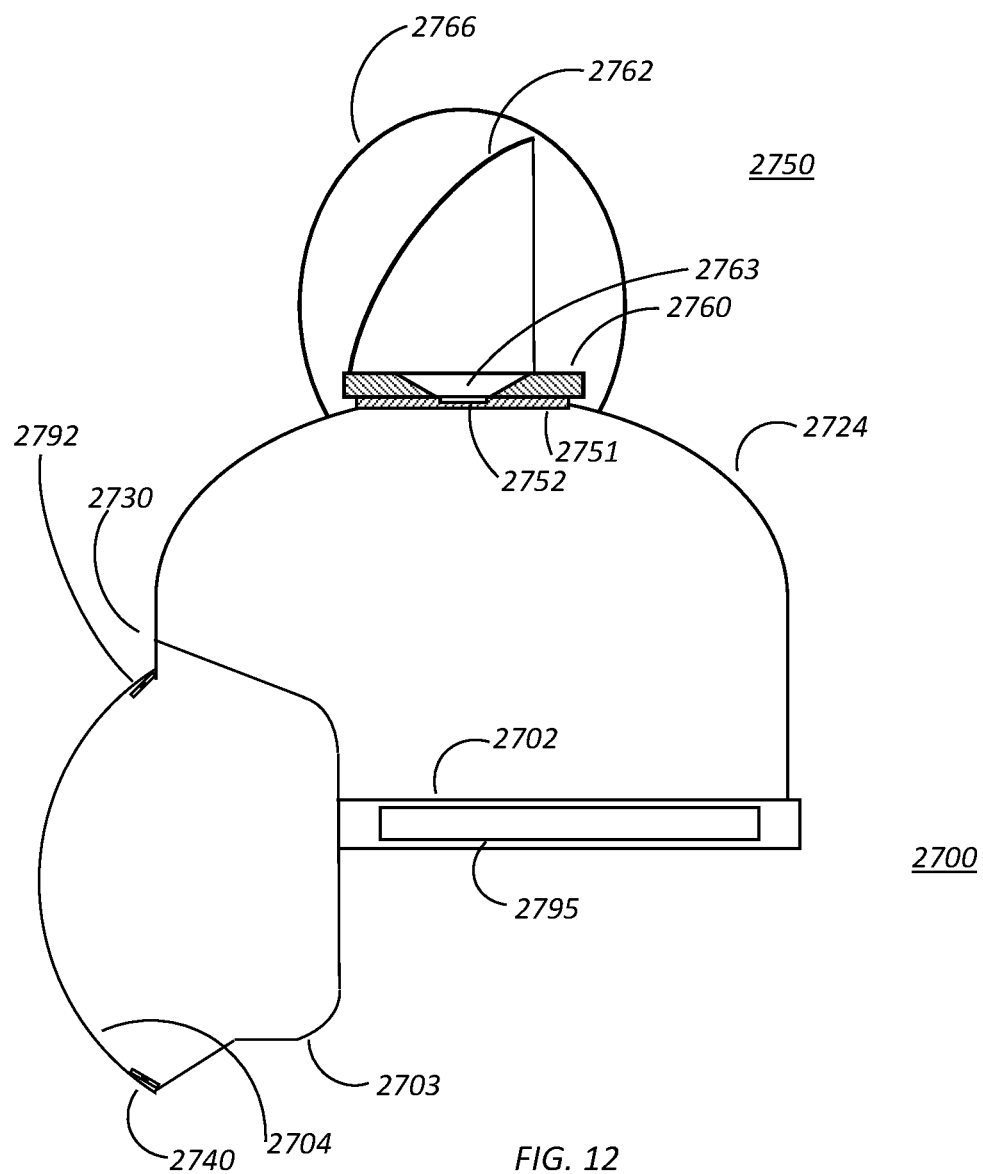
FIG. 12 illustrates an Extended Perception System with a head-mounted display and an integrated sensor subsystem employing a rotating focusing mirror.

FIG. 12 illustrates an Extended Perception System with a head-mounted display 2700 and an integrated sensor subsystem 2750 employing a rotating focusing mirror, said mirror focusing to an imaging sensor. The head mounted display 2700 is similar to the display subsystem of EXP System 2500. The glance angle detection subsystem can comprise camera 2791 (not shown, but analogous to 2591)

which provides an image of the user's right eye to processor 2795 and camera 2792 which provides an image of the user's left eye to processor 2795 or central camera 2793 (not shown, but analogous to 2593) which that provides an image of one or both of the user's eyes to an EXP processor 2795. One or more real image(s) and/or virtual image(s) and/or holographic image(s) can be projected onto, or by means of, all or part of display housing 2704. Display housing 2704 is secured to the user's head using display housing band 2702.

EXP Sensor Subsystem 2750 employs a rotating focusing mirror, said mirror focusing to an imaging sensor. The Sensor Base 2751 of 2750 is affixed to the top of helmet 2724. Sensor Base 2751 is illustrated in cross-section so that Imaging Sensor 2752 can be illustrated. The center of Mirror Base 2760 rotates about the center of Sensor Base 2751. Sensor Base 2751 is illustrated in cross-section so that Radiation Aperture 2762 can be illustrated. Dome 2766, affixed to helmet 2724 and/or Sensor Base 2751, protects all or part of the remainder of EXP Sensor Subsystem from contamination and damage. In the illustrated orientation, radiation from behind helmet 2724 passes through Dome 2766 (which is substantially transparent to said radiation) to the interior surface of Mirror Unit 2762. Said radiation is reflected by said interior surface of Mirror Unit 2762, passing through Radiation Aperture 2763 to produce an image on Imaging Sensor 2752. EXP Sensor Subsystem 2750 can be integrated with a display subsystem as illustrated in FIG. 12 or can be a separate EXP Sensor Subsystem. A benefit of EXP Sensor Subsystem 2750 is that it permits a large area of radiation to be imaged.

Figure 13A:
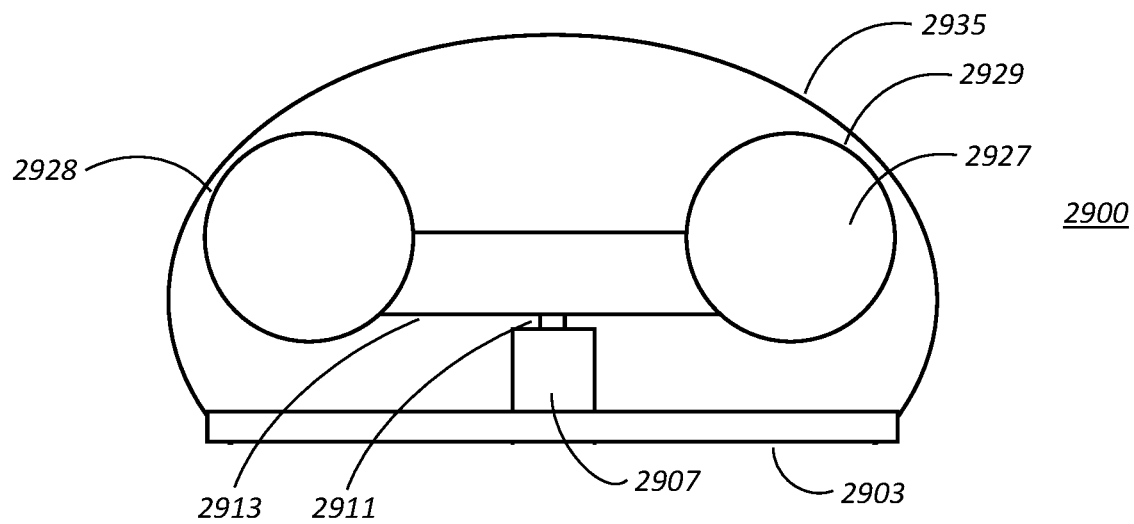
FIGS. 13A-13B illustrate an Extended Perception System Sensor Subsystem 2900 employing a rotating pair of cameras.
Figure 13B:
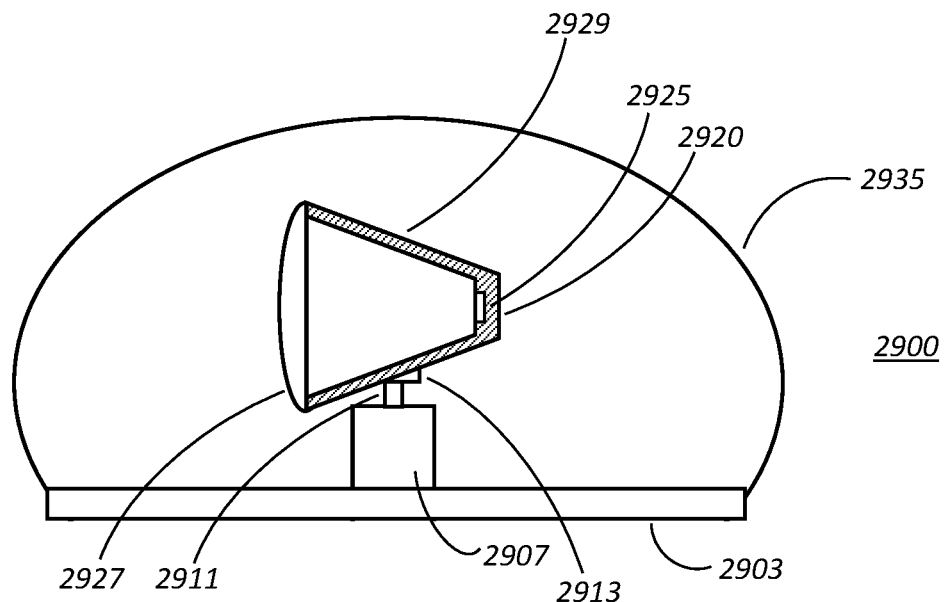

FIGS. 13A-13B illustrate an Extended Perception System Sensor Subsystem 2900 employing a rotating pair of cameras. The Sensor Base 2903 of 2900 is affixed to the top of a helmet like 2724. Cylindrical Platform 2907 is affixed to the center of Sensor Base 2903. Sensor Unit Support Axis 2911 rotates in the center of Cylindrical Platform 2907. For example, Cylindrical Platform 2907 can be an electric motor with Sensor Unit Support Axis 2911 being the rotating portion of said electric motor. The center of Sensor Unit Arm 2913 rotates about the center of Sensor Base 2903. Sensor Unit Arm 2913 is affixed to Sensor Unit Support Axis 2911. Substantially identical Sensor Collector Units 2928 and 2929 are affixed to opposite ends of Sensor Unit Arm 2913. Collector Unit Body 2920 is a shell, illustrated in cross-section so that the radiation path can be illustrated. Dome 2935, affixed to helmet 2724 and/or Sensor Base 2903, is substantially transparent to the radiation to be imaged on Imaging Sensor 2925 and protects all or part of the remainder of EXP Sensor Subsystem 2900 from contamination and damage. Radiation from the left is focused by Focusing Element 2927 to produce an image on Imaging Sensor 2925. The output of Collector Units 2928 and 2929 can be fed to the right and left eyes of the user(s) respectively to provide a stereoscopic view. It is easy for those knowledgeable in the art to adapt 2900 such that Sensor Collector Units 2928 and 2929 can converge to match the convergence of a user's eyes.

Camera Hands

When the data from a camera mounted on one hand (via a glove for example) is fed to one eye of the user and the data from a camera mounted on a second hand, via a glove for example, is fed to the user's other eye, theoretically the user could move his hands so that the images would superimpose in the brain to form a single stereoscopic view. Muscle jitter and imprecision of muscle control might make that difficult. In this embodiment, the EXP Processor Subsystem uses image processing software to stabilize the image from each camera and adapt the images so that they can be superimposed into a clear stable stereoscopic image by the user's brain. The experience is as if the user had eyes spaced the distance between the cameras. This improves depth perception at greater distances. Distances between converging cameras greater and less than the distance between eyes can be profoundly useful. Cameras, such as tiny sensors close to one another with very short focal lengths can be input to the EXP display subsystem to generate stereoscopic microscopic views.

As is the case with EXP embodiments herein, this can be useful in the world or simulated in a video game.

Likewise, aircraft with motor-driven, double gimbal-mounted sensors (e.g. cameras, and/or microphones) at the front and back of the aircraft and/or on the wingtips can at the user's direction or based on feedback from the EXP Processor Subsystem and/or the Monitor Subsystem converge on a location of interest by means of CGAM, for example, to provide useful stereoscopic images at great distances.

Data from sensors in or on a vehicle being fed to a user and/or remote or local operator can help that user and/or operator to "become one" with the vehicle. Data from any Sensor Subsystem (such as the one illustrated in FIGS. 5A-5D) can be fed (for example via a Processor Subsystem as illustrated in FIG. 1) to the EXP Display Subsystem illustrated in FIGS. 11A-11C.

The EXP display can have multiple display modes. For example, in one mode, a subset of the display can show a constant sweep of the views and provide an indicator as to the direction that the sweep is showing. In second mode, a subset of the display can show one or more views in which the EXP Processor Subsystem has determined to contain events that the user needs to see.

Part of the display can be a map showing what part of the visual field is being displayed on one or a given part of the display. For example, an image of the user's head can be displayed with one or more rays pointing towards the center of the head, said each of said rays emanating from an area of interest.

Sensor Database

Sensors (e.g. cameras, and/or microphones, etc.) in a set of stationary locations and/or in or on a set of moving objects (e.g. UAVs, robots, cars, trucks, people with mobile devices and/or sensor arrays) can work together to collect real-time sensory data of about a set of locations and/or a set and/or range of view angles of a set of locations. A Sensor Database can store or access the present locations of sensors, the present direction of their fields of view and other data necessary and/or useful to determine which sensor and/or sensors will be useful when there is a need to collect sensory data on a set of objects and/or locations from the desired point of view. Additionally, said Sensor Database can store or access the range of freedom of motion of the field of view of sensors to determine if one or more nearby sensors can be directed to view the set of objects and/or locations of interest. Additionally, said Sensor Database can store or access the speeds and availability of sufficiently proximal mobile sensor platforms relative to said set of objects and/or locations. CGAM input can be used in the recruitment of multiple sensors (recruited sensors) to provide a stereoscopic view of the location of interest. Herein, "access" refers to the process of rapidly finding that information if it is not already stored in the Sensor Database.

Tiny sensors floating in the wind, or self-propelled, or dropped from vehicles, such as unmanned vehicles (including but not limited to UAVs), are additional examples of potentially proximal mobile sensors and/or sensor arrays.

As the Internet of Things grows, many more sensors will be available for access. Data from properly located sensors, a high density of disorganized sensors, and/or numerous mobile sensors can create a detailed 3D representation of a space. A CGAM-based display can be used to "view" that space by moving about an area or volume designated to represent the space. As the user moves about that area or volume, data from single sensors or pairs (or other groups) of sensors can be directed to one or both of the user's eyes to produce a changing 2D image or a changing stereoscopic image of the view from that direction and the selected range. AGAM is also useful for displaying such a space. This space can be actual or virtual or a combination thereof.

Groups of analogous devices with efferent capabilities can be used for a wide variety of applications. For example, each element of a subset of such effectors (devices used to produce a desired change in an object in response to input) can be recruited to act as a heliostat to redirect energy from a separate source (such as the sun) to one or more areas. Each member of a subset of such effectors can be recruited to direct energy from itself to one or more areas. Such energy can include, but is not limited to, electromagnetic radiation of one or more frequencies (such as radio, microwave, IR, visible, UV) collimated or uncollimated, such as a laser or LED or acoustic radiation. Coordination of a group of effectors including, but not limited to recruited effectors can result in a device that can behave as a solar concentrator, a display, a microphone and/or many other devices. Each effector can produce a different and varying electromagnet field strength and/or direction in order for the group to implement complex static or dynamic electromagnetic fields.

The embodiments described herein represent mostly visual sensors and effectors. Sound (infrasound, audible sound, and/or ultrasound—through any medium, e.g. air, water, and/or ground) analog embodiments can be quite useful.

For example, arrays of directional microphones or array microphones can work together as described herein for visual sensors to localize the source of sound events, to correlate sound events with visual events, and/or to work in reconfigurable groups to "visualize" different locations from different angles and ranges.

For example, AGAM analogs can be used to have "ears in the back of the head." A sound sensor array on the bottom(s) of a set of shoes can be used to detect and locate the origin of one or more sources of sound that has traveled through the ground. This can result in a modern and greatly improved version of the "ears down to the ground" technique.

As is the case with other EXP embodiments AGAM and CGAM will be useful interfaces for video games with displays worn by gamers like those described herein or displayed on conventional screens.

EXP Processor Subsystem

Functions of the EXP Processor Subsystem include (but are not limited to) one or more of the following, and/or combinations thereof:

1. the processing of sensor data for display to the user and/or to others (local and/or remote) and/or transfer to others. Others can comprise the EXP Monitoring Subsystem. This can be as simple as transferring the sensor data to a local display.

2. the processing of sensor data to make it more useful to display and/or transfer.

3. looking for patterns in one or multiple sensor views simultaneously to algorithmically determine the most relevant data to display and/or transfer. Many types of events may be of interest, such as the presence of potential game or dangerous animals or the presence of, or suspicious movement of one or more vehicles. This can be as simple as the detection of movement relative to the surroundings and thus can be analogous to the function of rods in the retina. This can be very useful in EXP displays where the sensor array provides data to the EXP Processor about what is outside the view of the user. When movement is detected, the User is notified of said movement and he can then observe the relevant sensor view via AGAM, for example.

4. The view of an event of interest can automatically be displayed in a display window. The type of event can be determined and displayed as well as its direction and/or location and the view in which the source is currently best observable. The user's observation of the event of interest or its source can be enhanced by highlighting its vicinity on the display or otherwise directing the user to its location in the displayed view(s). Image enhancement can improve its observation.

5. the integration of data from multiple sensors. For example, visual data from two cameras can be "aligned" for presentation to a user's eyes so as to create a 3D stereoscopic image. For example, the EXP Processor Subsystem can correlate a flash of light and a particular sound signature to determine that a shot has been fired, the type of weapon that fired the shot and sound and/or light localization algorithms can verify location and determine range of the shots.

6. the integration of sensor data, processed data, and/or augmented data and/or information from other sources.

7. the storage of sensor data and/or transfer of sensor data for storage elsewhere. This stored data can provide a multiview representation of a situation that can serve as an objective witness to that situation. The knowledge that this record is being kept will tend to prevent those with that knowledge from committing wrongful acts.

Input to an EXP Processor Subsystem comprises data from one or more, local and/or distant sensors, and/or computed and/or stored information from one or more local and/or distant sources.

Output from the EXP Processor Subsystem can be displayed locally to the user of a wearable sensor array and/or other users of wearable displays (local and/or remote) and/or others simply viewing displays (local and/or remote). Output from the EXP Processor Subsystem can be displayed locally to the driver and/or passengers of a vehicular-based sensor array and/or to other users of vehicular-based sensor arrays local and/or remote and/or others. Others local and/or remote can comprise security personnel and/or systems who can determine more about the motives and/or activities of the user of a wearable or vehicular sensor array by seeing what said user is seeing and/or is available from the user's sensor array. For example, the view inside of a vehicle, including the actions of the occupants, can be transmitted to a police car that has stopped the vehicle. This can help the police officer to determine the risk or lack thereof of approaching the vehicle. Said views can be transmitted to the police officers' supervisors so that they can assist the police officer to make better decisions. Another example is for these views to be transmitted to a security checkpoint so that the checkpoint personnel can view the actions of the vehicle's occupants. Others local and/or remote can comprise personnel and/or systems that can monitor views that the user is not viewing, evaluate the views available to his sensor array, and/or use information from other sources such as other sensor arrays to: advise the user; intervene in the situation; and/or direct the user to change his situation.

All, or parts, of the EXP Processor Subsystem can be local with respect to a subset of the sensor array. All, or parts, of the EXP Processor Subsystem can move as a subset of the sensor array moves.

All, or parts, of the EXP Processor Subsystem can be local and/or remote with respect to a subset of the sensor array.

All, or parts, of the EXP Processor Subsystem can be mobile. A subset of the EXP Processor Subsystem can comprise a mobile device, such as a mobile phone or tablet. A subset of the EXP Processor Subsystem can be worn or carried by a person. A subset of the EXP Processor Subsystem can be built into or carried in a vehicle.

All, or parts, of the EXP Processor Subsystem can be fixed.

A subset of the sensor array's communication with a subset of the EXP Processor Subsystem can be routed by direct wiring. A subset of the sensor array's communication with a subset of the EXP Processor Subsystem can be routed wirelessly via, short range communications (e.g. Bluetooth, IR, WiFi, etc), longer range communications such as cell tower communications, and/or long range communications such as satellite or ULF or radio communications.

Aperture synthesis processing can treat a subset of a visual or auditory array as one big antenna.

EXP Intervention Subsystem

The user and/or any of the observers of EXP Sensor Subsystem data (processed or raw), the EXP Processor Subsystem data, and/or the EXP Monitoring Subsystem data that are suitably authorized can trigger an intervention. Said intervention can be real time.

Said intervention can comprise providing advice, commands, and/or information to the user and/or any of the observers of EXP Sensor Subsystem data (processed or raw), EXP Processor Subsystem data, and/or an EXP Monitoring Subsystem. Said intervention can comprise providing advice, commands, and/or information to others. For example, police, fire, rescue, ambulance, military, news and/or others might be informed to intervene in a situation. For example, the intervention can comprise information through a local loud speaker and/or a mobile device audible and/or visible to a party or parties local and/or remote who can intervene in the situation. Otherwise uninvolved persons and/or systems that are nearby can be recruited to intervene. Intervention can comprise the activation of an automated response by a user and/or any of the observers of EXP Sensor Subsystem data (processed or raw), the EXP Processor Subsystem data, and/or the EXP Monitoring Subsystem.

One embodiment employs EXP 1000 in car 1051 and is intended primarily to protect the rights of the driver. Video and audio data of car 1051's surroundings and interior are captured by EXP 1000's sensors and transmitted to the EXP Processor of EXP 1000. The data from the EXP 1000 can be streamed to a remote monitoring service (Monitor Subsystem) via the mobile device's cellular connection. Thus, EXP 1000 can detect, document and report to a monitoring service and/or car 1051's user(s) and/or insurance company and/or authorities a crash or other damage accidental or intentional to car 1051. EXP 1000 can also detect, document and report to a monitoring service and/or car 1051's user(s) and/or insurance company and/or authorities any unauthorized entry into the vehicle. As such, EXP 1000 can serve as an alarm system. This can help reduce car theft and hijackings and expedite the recovery of car 1051 in the unlikely event that it is stolen or hijacked. A device plugged into car 1051's OBD II port can wirelessly, or by wire, transmit information about car 1051 including speed information to the mobile device acting as the EXP Processor for EXP 1000. GPS and acceleration data can be captured by functions internal to that mobile device. This data from the EXP 1000 can be streamed to a remote monitoring service via the mobile device's cellular connection. If the driver is pulled over by a police officer, this data can be used to verify or deny the veracity of an accusation by a police officer. Data from car 1051's state of registration can be downloaded via the mobile device's cellular connection from that state's department of motor vehicles indicating its current registration status and emissions test status to further confirm or deny possible charges regarding the status of those variables. When a subscriber to the monitoring service is pulled over, the monitoring service can, in real time, observe and record the interaction between the police officer and the driver and passengers of car 1051. An agent of the monitoring service (with the streamed data in front of him), for example a lawyer, can then discuss the situation with the police officer and potentially provide data that confirms or denies the officer's accusation(s) via the EXP Processor's mobile device or microphone/loud speaker 1052. Microphone/loud speaker 1052 can be temporarily or of a longer duration affixed to car 1051 or can be integrated into 1034. This embodiment can help reduce inaccurate traffic stops and help to maintain a civil interaction between the police officer and driver of car 1051. EXP 1000 can also document and record road rage occurrences. Car 1051 if clearly marked as having an ExP system such as this is much less likely to be involved in theft, hijacking, road rage events, or inaccurate traffic stops. As described elsewhere herein, the view of the interior of car 1051 can be transmitted to a display viewed by the police officer and/or his supervisor(s) to make the police officer's job safer.

In EXP embodiments, the Intervention Subsystem can be used to monitor and report on other vehicles in the view of the EXP System's Sensor Subsystem. For example, an EXP Sensor Subsystem can be used to sense the tags of vehicles within their view. The EXP Processor Subsystem can interpret the sensor data to recognize the tag numbers of said vehicles. The tag number information can be compared with data downloaded locally or said tag data can be uploaded to another system to be compared with information located there. Said information can comprise information about the tag numbers of interest to authorities such as: stolen vehicles, vehicles involved in crimes (including, but not limited to Amber Alerts), vehicles with unpaid parking tickets, vehicles with expired registrations, vehicles owned by people with outstanding warrants. More actively, the EXP System can compare its vehicle's speed data (from said vehicle's computer) to visual information about other vehicles tags to determine the speed of said other vehicle. That data can be combined with GPS data to determine the legal speed limit at the location of those other vehicles. In this way, the EXP System can determine if viewed vehicles are exceeding the speed limit. When a violator has been detected, that information, plus information regarding the time, location and direction of the offending vehicle can be transmitted to the police for them to take the appropriate action. Alternatively, the EXP System can transmit its evidence of the offence to the appropriate authorities so that they can automatically generate a ticket. Likewise, EXP Processor Subsystem software can detect other offenses such as reckless driving, road rage, car jackings, impaired driving, running stop signs or lights, violations of school bus laws, etc. Such EXP Systems can be in police cruisers or other vehicles. When such an EXP System is in an individual's vehicle, it will be useful for the authorities to reward the EXP System's owner with a bounty or a reduction in the owner's vehicle registration fees. An EXP System can record crashes to determine who was responsible. An EXP System can also record activities inside a car to provide an objective record of what has occurred inside a vehicle, to determine veracity of claims such as date rape.

An EXP System in a car might utilize elements of a self-driving or otherwise automated car as ExP subsystems. An EXP System in a car might utilize elements of a car equipped with one or more built-in cameras.

Data from more than one vehicle can be integrated to provide a "view" greater than is possible with data from just one vehicle. For example, real-time data integration from multiple vehicles can track a given vehicle in real-time and non-realtime data from multiple vehicles can provide information about the location history of an otherwise non-cooperating vehicle at any given time in the past. This can be used to provide a list of suspects to a crime or to prove the innocence of others.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A display system, configured to display a very wide angle of visual data; the display system further comprising:
    a head mounted display device, configured to be mounted on a head of a user having a limited field of view;
    a processor, communicatively coupled with the head mounted display device;
    an amplified glance angle module, affixed to the head mounted display device and further comprising:
        a glance angle detection system, communicatively coupled to the processor;
        a plurality of cameras affixed to the head mounted display device and communicatively coupled to the processor; wherein the plurality of cameras communicates the very wide angle of visual data to the processor; wherein the very wide angle of visual data exceeds the limited field of view;
    wherein the processor is programmed to perform instructions in this order to:
    (a) determine a direction where the user wants to view using, at least in part, a glance angle from the glance angle detection system;
    (b) amplifying the glance angle creating an amplified glance angle;
    (c) display to the user a subset of the very wide angle of visual data centered on the amplified glance angle creating a deflected center of a field of view on the head mounted display device; wherein the subset includes visual data based on the deflected center of the field of view that the user could not see without rotating the head at least 90 degrees rotationally in a movement direction of the head measured from an axis defined by the head when looking straight ahead; wherein the movement direction is at least one member of a movement direction set consisting of horizontal movement and vertical movement; and
    (d) adjust the subset of the very wide angle of visual data displayed on the head mounted display device based on a change in the direction where the user wants to view beyond the limited field of view.

2. The display system of claim 1, wherein the head mounted display device further comprises a display housing; wherein subset of the very wide angle of visual data is displayed on the head mounted display device in real time.

3. The display system of claim 1, wherein the glance angle detection system further comprises: at least one camera, attached to the head mounted display device, communicatively coupled to the processor; wherein at least one member of a detection set consisting of: the processor, and the at least one camera is programmed with instructions to detect and communicate a glance angle of at least one member of an eye set consisting of a user's first eye and a user's second eye to the processor.

4. The display system of claim 1, further comprising a menu displayed by the head mounted display device; wherein the processor is further programmed with additional instructions to:
    use a glance angle to point to a menu location; and
    receive a signal from the user to trigger a menu item selection.

5. The display system of claim 1, wherein the glance angle detection system is communicatively coupled to the processor; wherein at least one member of a detection set consisting of: the processor, and the at least one camera is programmed with instructions to detect and communicate a glance angle of each eye of the user to the processor.

6. The display system of claim 1, wherein the processor determines at least one component of the direction where the user wants to view by, at least in part, amplifying a corresponding component of a glance angle.

7. The display system of claim 6, wherein a component of the glance angle corresponds to an angle of at least one eye relative to the head caused substantially by medial rectus and lateral rectus muscles of the at least one eye.

8. The display system of claim 6, wherein a component of the glance angle corresponds to an angle of at least one eye relative to the head caused substantially by superior rectus and inferior rectus muscles of the at least one eye.

9. The display system of claim 6, wherein the processor determines at least two components of the direction where the user wants to view by at least in part, amplifying a first corresponding component and a second corresponding component.

10. The display system of claim 1, wherein the very wide angle of visual data is created by the plurality of cameras communicating imagery of a substantially full space around a user's head to the processor, a primary imagery displayed to the user at a given time is a subset of the substantially full space.

11. The display system of claim 1, wherein the processor is further programmed with additional instructions to:
receive a signal to demagnify a first subset of the very wide angle of visual data.

12. The display system of claim 11, wherein the processor is further programmed with additional instructions to:
demagnify a first subset of the very wide angle of visual data; creating a demagnified subset of the very wide angle of visual data.

13. The display system of claim 12 wherein the processor is further programmed to:
display the demagnified subset of the very wide angle of visual data.

14. The display system of claim 1, wherein the processor is further programmed with additional instructions to:
receive a signal to magnify a first subset of the very wide angle of visual data.

15. The display system of claim 14, wherein the processor is further programmed with additional instructions to:
magnify a first subset of the very wide angle of visual data; creating a magnified subset of the very wide angle of visual data.

16. The display system of claim 15 wherein the processor is further programmed to:
display the magnified subset of the very wide angle of visual data.

17. The display system of claim 1 wherein the processor is further programmed to:
determine a focus direction of a location in space that the user wants to focus on.

18. The display system of claim 17 wherein the processor is further programmed to:
determine a range of the location in space that the user wants to focus on.

19. The display system of claim 17 wherein the processor is further programmed to:
receive a first signal from the user to magnify a visual display from the location in space.

20. The display system of claim 17 wherein the processor is further programmed to:
receive a first signal from the user to magnify an audio display from the location in space.

21. The display system of claim 17, wherein the processor is further programmed with further instructions to:
use at least one glance angle to point to a menu location; and
receive a first signal from the user to trigger a menu item selection.

22. The display system of claim 1 further comprising a head orientation determination subsystem wherein the processor uses, at least in part, input from the head orientation determination subsystem to determine the direction where the user wants to view.

23. The display system of claim 1, wherein the plurality of cameras includes at least one virtual camera.

24. The display system of claim 1, wherein the head mounted display device further comprises at least one two-dimensional display.

25. The display system of claim 1, wherein the head mounted display device further comprises at least one stereoscopic display.

26. The display system of claim 1, wherein the processor is programed to display sensor data from at least one member of a sensor set consisting of vehicular-based sensor subsystems, worn sensor subsystems, fixed sensor subsystems and other sensor subsystems.

27. The display system of claim 26, wherein the sensor data includes virtual sensor data.

28. The display system of claim 1, wherein the processor is further programmed with instructions to display visual data including at least one member of a visual data set consisting of business software data and video game data.

29. The display system of claim 1, wherein the processor is further programmed with instructions to determine patterns in at least one camera view to algorithmically determine a most relevant data to display.

30. The display system of claim 29, wherein the processor is further programmed with instructions to notify the user of the most relevant data.

31. he display system of claim 1, wherein the processor is further programmed with instructions to display virtual image information in addition to actual image information.

32. The display system of claim 1, wherein the display is divided into areas; each area displays a view from a different combination of sensors.

* * * * *